United States Patent [19]

Jahns

[11] Patent Number: 4,896,088
[45] Date of Patent: Jan. 23, 1990

[54] FAULT-TOLERANT SWITCHED RELUCTANCE MACHINE

[75] Inventor: Thomas M. Jahns, Schenectady, N.Y.

[73] Assignee: General Electric Company, Schenectady, N.Y.

[21] Appl. No.: 331,197

[22] Filed: Mar. 31, 1989

[51] Int. Cl.[4] .................................. H02P 8/00
[52] U.S. Cl. ............................ 318/696; 318/685; 318/701
[58] Field of Search .................. 318/696, 685, 701

[56] References Cited

U.S. PATENT DOCUMENTS

| | | | |
|---|---|---|---|
| 4,434,389 | 2/1984 | Langley et al. | 318/254 |
| 4,595,865 | 6/1986 | Jahns | 318/254 |
| 4,772,839 | 9/1988 | MacMinn et al. | 318/696 |

OTHER PUBLICATIONS

Langley, L. W. and Kidd, H. K., "Testing of a Redundant Motor Designed for Space Shuttle Activation", Proc. of 1984 Nat. Aerospace & Electronics Conf., May 1984, pp. 606–612.

Primary Examiner—William M. Shoop, Jr.
Assistant Examiner—Saul M. Bergmann
Attorney, Agent, or Firm—Jill M. Breedlove; James C. Davis, Jr.; Marvin Snyder

[57] ABSTRACT

A switched reluctance motor drive or generator takes advantage of the characteristic independence of concentrated phase windings to optimize fault-tolerant operation. No "dead zones" in motor torque production or generator voltage output are created by faulted phases. One embodiment prevents unbalanced magnetic pull on the rotor despite deactivation of a faulted phase by employing multiple pairs of opposed stator pole windings in each phase.

20 Claims, 6 Drawing Sheets

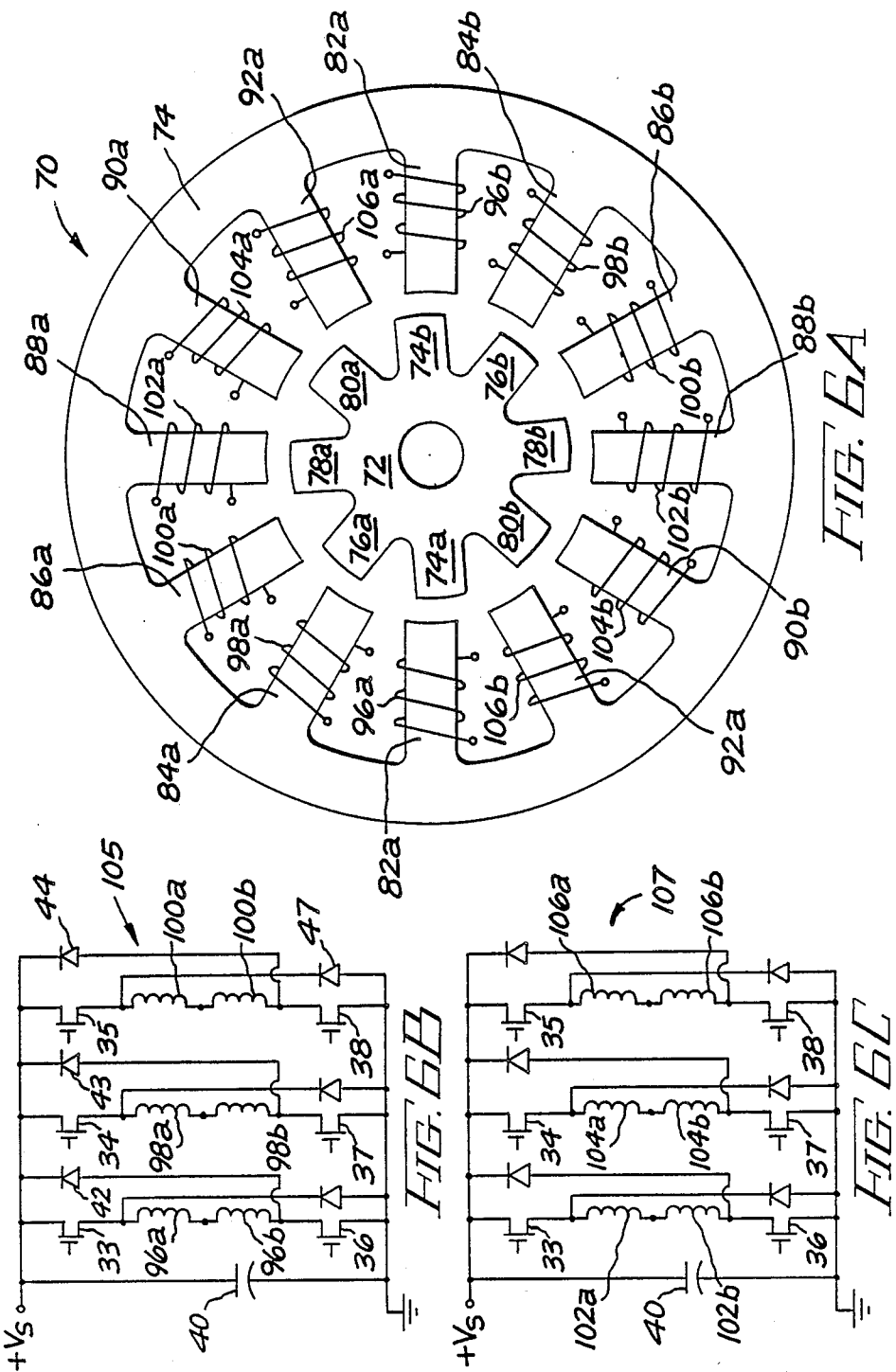

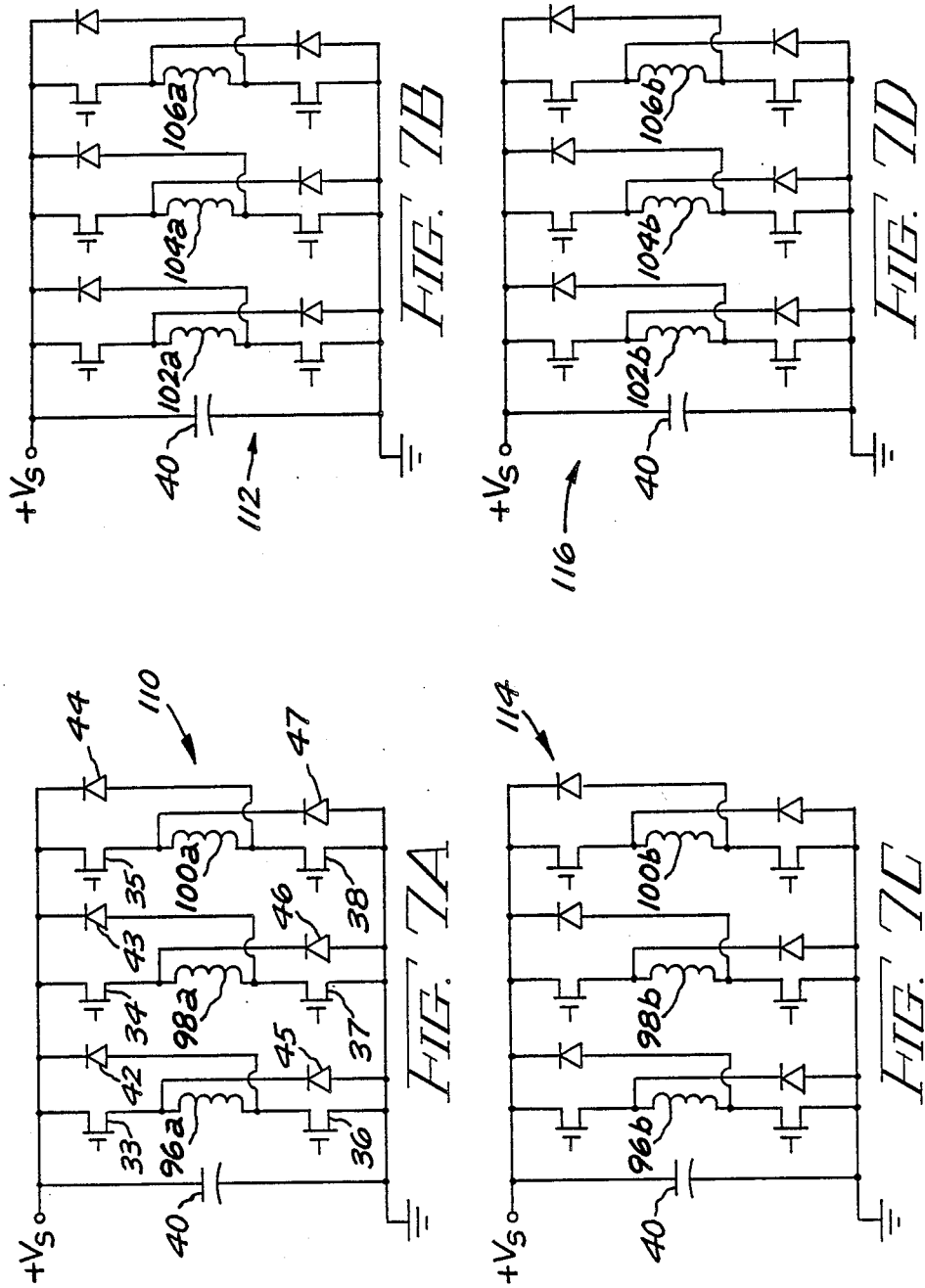

FAULT-TOLERANT SWITCHED RELUCTANCE MACHINE

FIELD OF THE INVENTION

The present invention relates generally to fault-tolerance in motor drives and generating systems. More particularly, this invention relates to switched reluctance machines which have the capability to continue operating with minimum performance degradation in spite of machine or inverter faults.

BACKGROUND OF THE INVENTION

AC machines are not inherently fault-tolerant. The primary reason is that the windings of AC machines are closely coupled magnetically, so that a short circuit in one winding has serious effects on adjacent phases. The problem is exacerbated in AC machines having permanent magnets because rotating magnets excite potentially dangerous high currents in any short circuit path. Approaches to enhancing the reliability of AC motor drives and generator systems generally involve the use of two or more AC machines. For example, a common approach is to connect two or more machines on a single shaft. Alternatively, gearing is used to couple the machines together. However, there are weight, volume and cost disadvantages associated with the use of additional machines, thus making such approaches undesirable or even impractical for many applications.

Another approach, which is described in U.S. Pat. No. 4,434,389, issued to Langley et al., is to utilize redundant sets of distributed windings, i.e., windings spread over a number of slots around the air gap periphery. This approach, for machines energized through an inverter, involves dividing a permanent magnet motor into sections, each section comprising one set of magnetically-coupled distributed windings. Each set of windings is energized by a separate commutation circuit, so that the total torque produced is the sum of the torques generated by each set of distributed windings. For each motor section, a command unit detects failures and removes the entire failed motor section from service. Disadvantageously, the close magnetic coupling of the distributed windings makes it necessary to disable the entire set of section windings, even though the fault has developed in only one of these windings. Thus, torque production is reduced by the amount contributed by the entire motor section rather than by the smaller portion delivered by a single winding.

In contrast to AC machines, a switched reluctance (SR) machine is wound using concentrated windings, i.e., windings concentrated on projecting motor poles. As a result, the phase windings of a SR machine are essentially free of any magnetic coupling so that high currents in one winding will not magnetically induce high currents in adjacent phase windings. The present invention utilizes this characteristic magnetic independence of switched reluctance machine phases as the basis for a compact, fault-tolerant motor drive or generator system. Such a fault-tolerant drive can be particularly useful in aerospace applications for which highly reliable drives are necessary.

Switched reluctance machines conventionally have multiple poles on both the stator and the rotor; that is, they are doubly salient. There is a concentrated winding on each of the stator poles, but no windings or magnets on the rotor. Each pair of diametrically opposite stator pole windings is connected in series or parallel to form an independent machine phase winding of the multiphase SR machine. Motoring torque is produced by switching current in each machine phase winding in a predetermined sequence that is synchronized with angular position of the rotor, so that a magnetic force of attraction results between the rotor poles and stator poles that are approaching each other. The current is switched off in each phase before the rotor poles nearest the stator poles of that phase rotate past the aligned position; otherwise, the magnetic force of attraction would produce a negative or braking torque. The torque developed is independent of the direction of current flow, so that unidirectional current pulses synchronized with rotor movement can be applied to the stator pole windings by an inverter using unidirectional current switching elements, such as transistors or thyristors. For use as a generator, the current pulses in each machine phase winding are simply shifted so that current flows when the rotor poles are moving past alignment towards the unaligned position.

A SR motor drive or generator system operates by switching the machine phase currents on and off in synchronism with rotor position. That is, by properly positioning the firing pulses relative to rotor angle, forward or reverse operation and motoring or generating operation can be obtained. Usually, the desired phase current commutation is achieved by feeding back a rotor position signal to a controller from a shaft angle transducer, e.g. an encoder or a resolver. However, in order to reduce size, weight and cost in SR motor drives and generating systems, techniques for indirect rotor position sensing have been developed, thus eliminating the need for a shaft angle transducer. One such technique is disclosed in commonly assigned U.S. Pat. No. 4,772,839, which issued on Sept. 20, 1988 to S. R. MacMinn and P. B. Roemer.

Current regulators are typically employed for controlling phase current amplitudes in a SR machine. There are several types of current regulators. For example, individual low-resistance current shunts may be coupled to each machine phase winding to detect the current level in each phase. The output of each current shunt is connected to a separate voltage comparator. Each comparator is also connected to a separate potentiometer for setting the current limit. Another type of current regulator, which eliminates the need for discrete current sensors, is disclosed in U.S. Pat. No. 4,595,865, issued to T. M. Jahns on June 17, 1986 and assigned to the instant assignee.

Commonly assigned copending U.S. patent application Ser. No. 304,159, filed on Jan. 31, 1989 by G. B. Kliman, S. R. MacMinn and C. M. Stephens, discloses a system for detecting and isolating faults in a SR motor drive, whereby faulted motor phases are deactivated and motor operation is continued. More specifically, this patent application, which is hereby incorporated by reference, describes a SR machine fault management system which detects faults through phase current differential sensing and phase flux differential sensing. In addition, a method is provided for starting the motor when stopped in a "torque dead zone" created by a faulted phase. As used herein, the term "torque dead zone" is a rotor angular position region in which positive motoring torque cannot be produced by any of the intact non-faulted phases. By way of contrast, in a SR generator system, a "voltage output dead zone" is the counterpart to a torque dead zone in a SR motor drive.

As used herein the term "voltage output dead zone" is a rotor angular position region in which no voltage output can be generated by any of the intact non-faulted phases.

Although the hereinabove cited patent application advantageously provides a system for isolating and detecting SR machine phase faults, it is desirable to enhance the characteristic independence of SR machine phase windings even further in order to optimize SR machine fault-tolerant performance. In accordance therewith, it is desirable to simplify the fault-tolerant SR machine drive and to prevent the development of "torque dead zones" in motors and "voltage output dead zones" in generators.

OBJECTS OF THE INVENTION

It is, therefore, an object of the present invention to provide a new and improved switched reluctance motor drive or generator system.

Another object of this invention is to provide a SR motor drive or generator system which optimizes SR machine fault-tolerant performance by taking advantage of the characteristic independence of SR machine phase windings.

Another object of the present invention is to provide a fault-tolerant SR motor drive or generator system which can continue operating with minimal performance degradation despite the existence of a fault in the machine or in its associated power electronics.

Another object of the present invention is to provide a fault-tolerant SR motor drive or generator system for which the rotor does not experience an unbalanced magnetic force in spite of the existence of a fault causing excitation to be removed from a respective stator phase.

Still another object of the present invention is to provide a fault-tolerant SR motor drive having no "torque dead zones" created by faulted phases that prevent the intact phases from producing torque in some rotor positions.

Yet another object of this invention is to provide a fault-tolerant SR generator system having no "voltage output dead zones" created by faulted phases that prevent the intact phases from generating output power in some rotor positions.

SUMMARY OF THE INVENTION

In accordance with the present invention, a new and improved switched reluctance motor drive or generator system is provided with capability to continue operating with minimal performance degradation in spite of the existence of machine or inverter faults. To this end, the present invention utilizes the characteristic independence of the concentrated phase windings of a SR machine.

In one embodiment of a SR motor drive according to the present invention, each stator pole winding is excited by a separate respective inverter phase leg. For a SR motor having N phases and K stator pole windings per phase (with K greater than or equal to 2), this drive embodiment uses K independent inverters, with N phase legs in each inverter. These inverters can be excited by the same DC source or, preferably, by separate DC sources to achieve even a higher level of fault tolerance. Loss of excitation to one stator pole winding does not affect excitation of the remaining (K−1) pole windings in the same phase, or excitation of any of the pole windings in the other phases; therefore, average torque production by the motor remains at approximately (NK−1)/NK of its normal, pre-fault value. Moreover, no "torque dead zones" are created by faulted phases in this new SR motor drive; that is, there are no rotor positions for which the remaining intact phases cannot produce torque. Hence, if the rotor is brought to a standstill condition following a fault, no special controls are needed to restart the machine.

In an alternative embodiment of a SR motor drive according to the present invention, each motor phase comprises at least two pairs of diametrically opposite stator poles. A stator pole winding is wound on each pole, and the pole windings on diametrically opposite poles are grouped together into pairs and connected either in series or in parallel. For a SR motor having N phases and J stator pole pairs per phase (for a total of 2NJ pole windings, with J greater than or equal to 2,) this drive embodiment uses J independent inverters, with N phase legs in each inverter. These inverters can be excited by the same DC source or, preferably, by separate DC sources to achieve even a higher level of fault tolerance. Loss of excitation to one pair of diametrically opposite pole windings does not substantially affect excitation of the remaining (J−1) pole winding pairs in the same phase, or excitation of any of the pole winding pairs in the other phases. Therefore, torque production continues at approximately (NJ−1)/NJ of its pre-fault value, and no torque dead zone is created. Advantageously, for this alternative SR motor drive configuration, a fault in one inverter leg which results in loss of excitation of one pair of stator pole windings will not produce unbalanced magnetic pull on the rotor.

Further, according to the present invention, the machine configurations described herein to realize fault-tolerant switched reluctance motor (SRM) drives for delivering mechanical power to a load also constitute fault-tolerant switched reluctance generator (SRG) systems for converting mechanical power into electrical power. Only the timing of the gating signals shifts with respect to rotor position in order to convert a motor drive into a generating system. Moreover, in a SRG system, voltage output dead zones, which are the counterparts to torque dead zones in a SRM drive, are eliminated by employing the fault-tolerant configurations of the present invention.

BRIEF DESCRIPTION OF THE DRAWINGS

The features and advantages of the present invention will become apparent from the following detailed description of the invention when read with the accompanying drawings in which:

FIG. 3 is a graphical illustration of the instantaneous torque waveform for the SRM drive configuration of FIG. 1 following loss of excitation of a faulted phase;

FIG. 6A is a cross-sectional view of an alternative embodiment of a SRM constructed in accordance with the present invention;

FIGS. 6B and 6C are schematic illustrations of a set of inverters employed to drive the SRM of FIG. 6A; and FIGS. 7A-7D are schematic illustrations of an alternative set of inverters employed to drive the SRM of FIG. 6A.

DETAILED DESCRIPTION OF THE INVENTION

Figure 1:
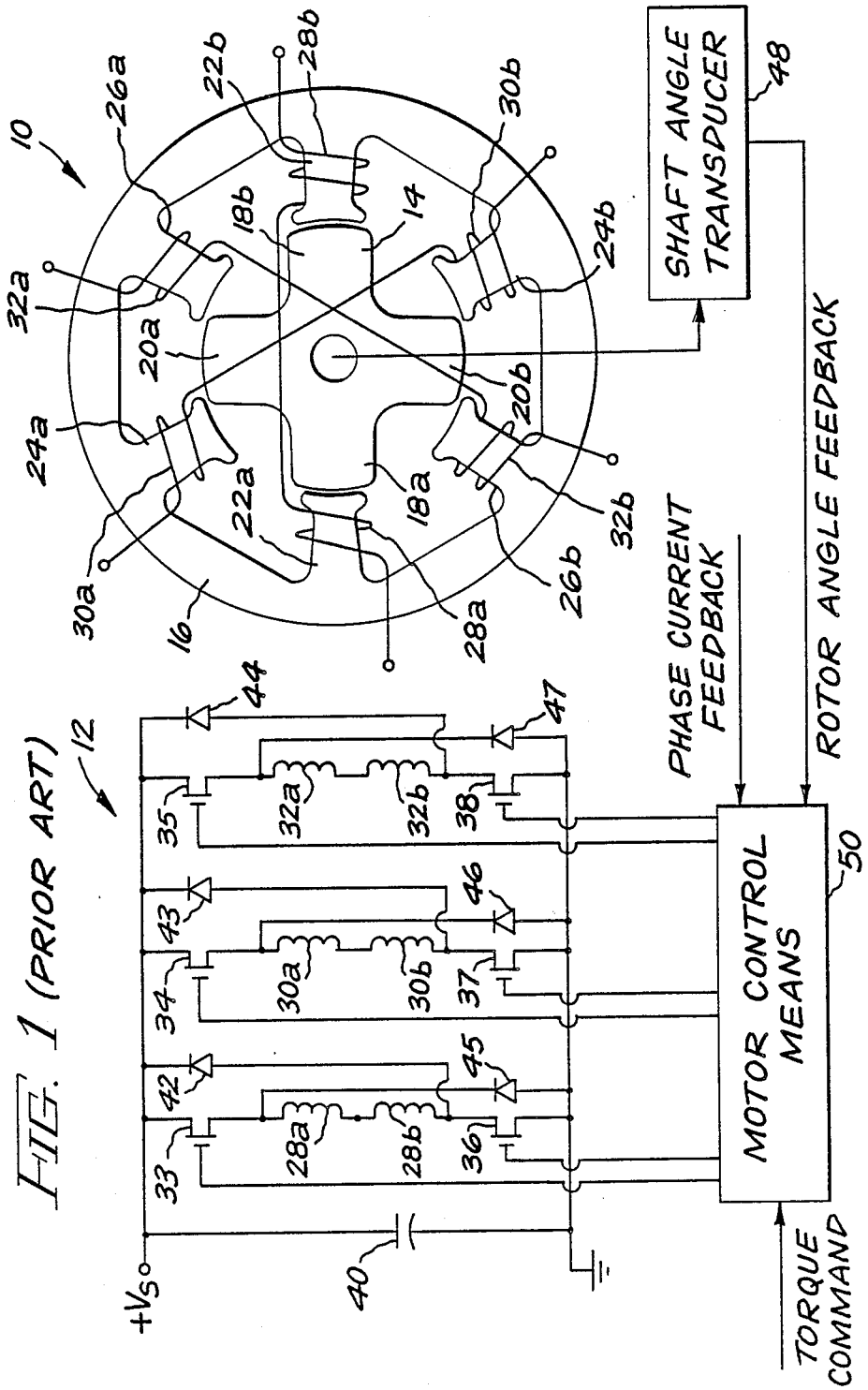
FIG. 1 is a schematic illustration of a conventional SRM drive.

FIG. 1 shows a typical switched reluctance motor (SRM) drive configuration. It is to be understood that the following description of a switched reluctance motor drive is provided by way of example only and that the principles of the invention apply equally to switched reluctance generator systems. Therefore, as used herein and in the claims, the term "machine" includes motors and generators.

Figure 2:
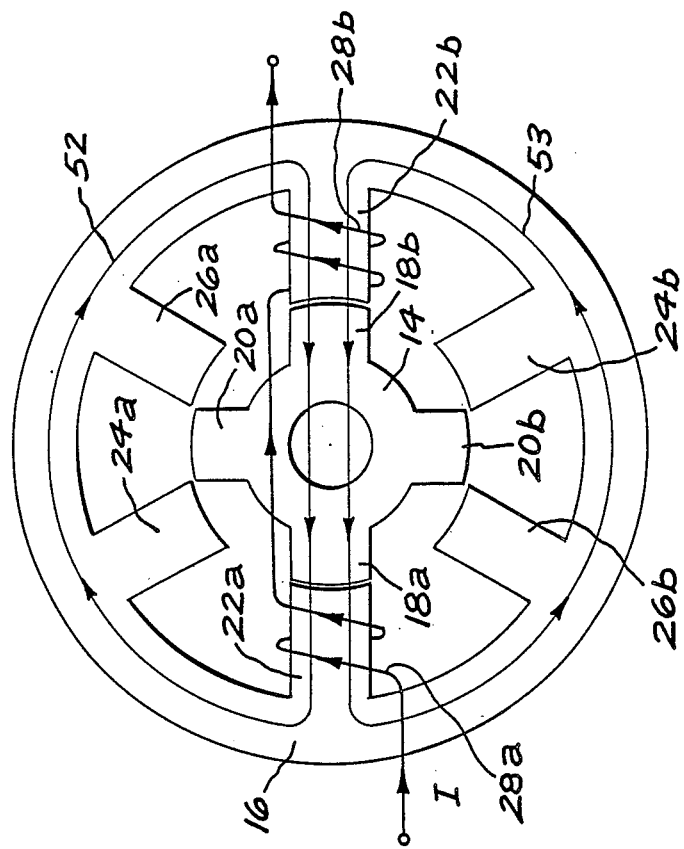
FIG. 2 is a cross-sectional view of a SRM illustrating the direction of current in an exemplary motor phase winding and further illustrating the direction of magnetic flux resulting therefrom.

By way of example, SRM 10 is illustrated as a three-phase machine with its associated power inverter 12. As shown, SRM 10 includes a rotor 14 rotatable in either a forward or reverse direction within a stationary stator 16. Rotor 14 has two pairs of diametrically opposite rotor poles 18a-18b and 20a-20b. Stator 16 has three pairs of diametrically opposite stator poles 22a-22b, 24a-24b and 26a-26b. Stator pole windings 28a-28b, 30a-30b and 32a-32b, respectively, are wound on stator pole pairs 22a-22b, 24a-24b and 26a-26b, respectively. Conventionally, the stator pole windings on each pair of opposing or companion stator pole pairs are connected in series to form a motor phase winding so that the current I in each phase produces a net magnetic flux linkage generating flux in the directions indicated by arrows 52 and 53 in FIG. 2. For example, as shown in FIG. 2, windings 28a and 28b are connected in series so that the current flows in the direction indicated. As illustrated in FIG. 1, the stator pole windings comprising each companion pair 28a-28b, 30a-30b and 32a-32b, respectively, are connected in series with each other and with an upper current switching device 33, 34 and 35, respectively, and with a lower current switching device 36, 37 and 38, respectively. The upper and lower switching devices each comprise a field-effect transistor (FET), but other suitable current switching devices may be used, such as bipolar junction transistors (BJTs), gate turn-off thyristors (GTOs) and insulated-gate bipolar transistors (IGBTs). Each motor phase winding is further coupled to a DC power supply by flyback or return diodes 45 and 42, 46 and 43 and 47 and 44, respectively. At the end of each conduction interval of each phase, stored magnetic energy in the respective motor phase winding is returned to the DC source through the respective pair of these diodes connected thereto. Each series combination of a motor phase winding with two corresponding switching devices and two flyback diodes comprises one phase leg of inverter 12. The inverter phase legs are connected in parallel to each other and are driven by a DC source, such as a battery or a rectified AC source, which impresses a DC voltage $+V_S$ across the parallel inverter phase legs. Capacitance 40 is provided for filtering transient voltages from the DC source.

Typically, a shaft angle transducer 48 is coupled to rotor 14 for providing rotor angle feedback signals to a motor control means 50. However, as hereinabove discussed, techniques are available for eliminating the shaft angle transducer. Phase current feedback signals are supplied to control means 50 from a current regulator (not shown), also hereinabove discussed, which receives phase current feedback signals from current sensors (not shown). An operator command, such as a torque command, is also generally inputted to control means 50. In well known fashion, such as described in U.S. Pat. No. 4,739,270, issued Apr. 19, 1988 to S. R. MacMinn and P. M. Szczesny and assigned to the instant assignee, the control means provides firing signals to inverter 12 for energizing the motor phase windings in a predetermined sequence.

In operation, if a fault occurs in a machine phase or an inverter phase of a conventional SRM drive such that excitation is lost to two opposing or companion stator pole windings, a "torque dead zone" is created by the faulted phase. Although rotor inertia can carry the rotor through this torque dead zone once it is rotating, special inverter controls are needed to restart the SRM if it stops in this dead zone created by the faulted phase. Once rotating, the torque dead zone cannot be eliminated by overexciting the remaining intact phases.

FIG. 3 is a graphical illustration of the instantaneous torque waveform (T) for the SRM drive configuration of FIG. 1 following loss of a faulted motor phase. The lost torque contribution due to the faulted phase is indicated by dashed lines 56. As illustrated, the average torque production $T_{AVE}$ is approximately two-thirds of its initial pre-fault value $T_0$.

Figure 4:
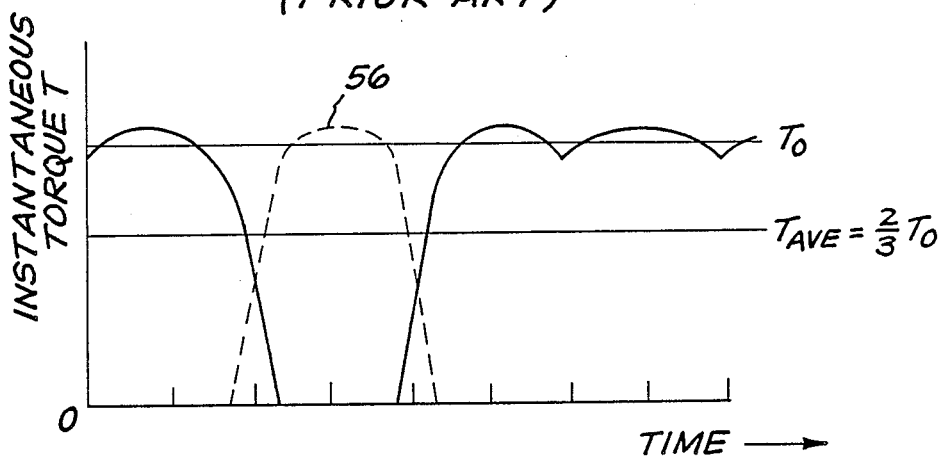
FIG. 4A is a cross-sectional view of a SRM constructed in accordance with the present invention.
FIGS. 4B and 4C are schematic illustrations of the inverters employed to drive the SRM of FIG. 4A.
Figure 4A:
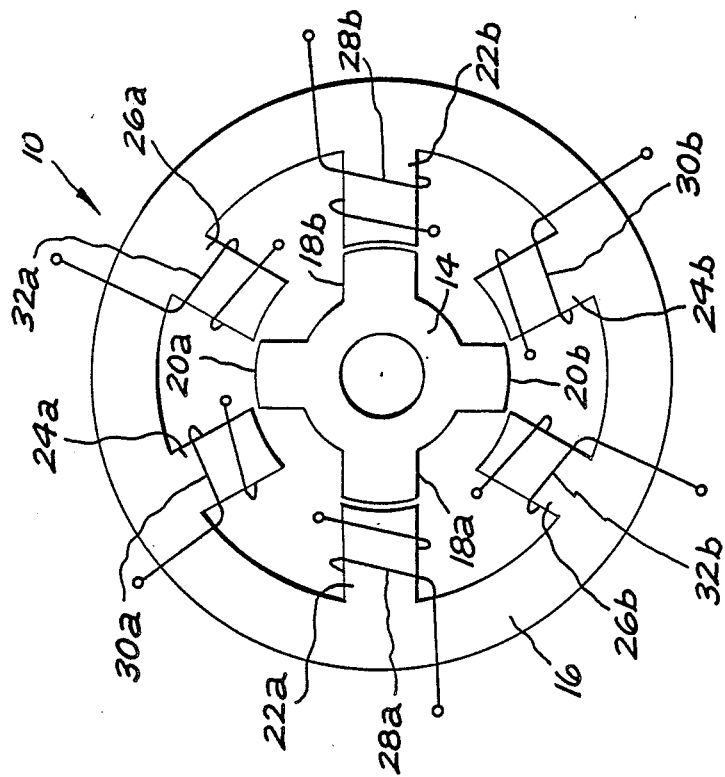
Figure 4B:
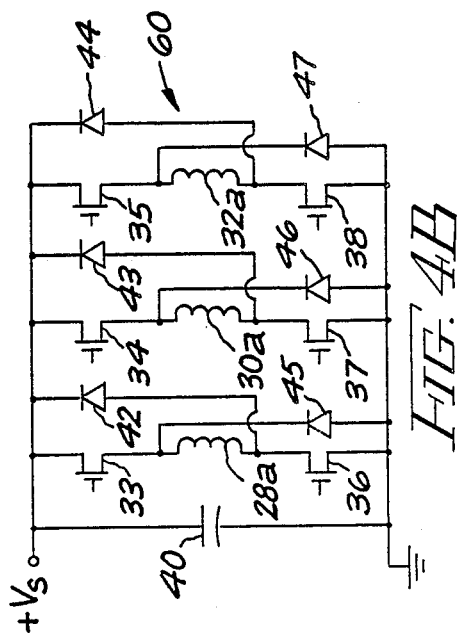
Figure 4C:
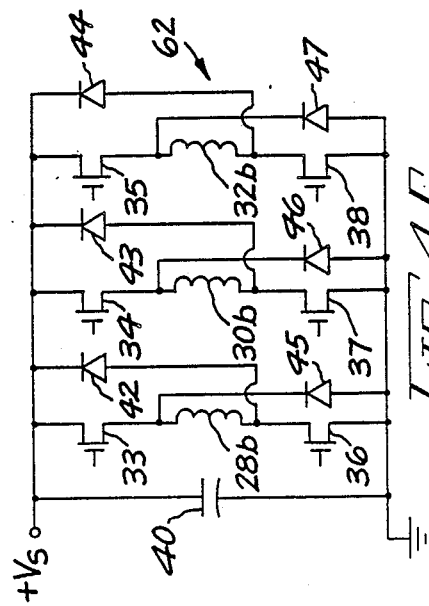

A fault-tolerant three-phase SRM drive according to the present invention is shown in FIG. 4A. In the following description, all stator pole windings which share the same magnetic relationship with the rotor, such as companion windings 32a and 32b, are considered part of the same machine phase regardless of whether they are directly interconnected. Unlike the conventional SRM drive of FIG. 1, the stator pole windings wound on opposing or companion stator pole pairs are not connected in series. Instead, each stator pole winding is excited by a separate respective inverter phase leg. In the preferred embodiment, two independent inverters 60 and 62 are utilized, each comprising three phase legs. Preferably, each inverter 60 and 62 is driven by a separate DC source to achieve a higher level of fault tolerance than if one power source were used. Alternatively, however, both inverters can be driven by the same DC source. As shown, each respective phase leg of each inverter excites one stator pole winding respectively. Thus a first phase leg of each of inverters 60 and 62 excites stator pole windings 28a and 28b, respectively; a second phase leg of each of inverters 60 and 62 excites stator pole windings 30a and 30b, respectively; and a third phase leg of each of inverters 60 and 62 excites stator pole windings 32a and 32b, respectively. Thus each phase leg, respectively, of each inverter corresponds to one of the three motor phases, respectively, of SRM 10.

During normal, non-faulted operation, each stator pole winding comprising a companion pair conducts simultaneously during a predetermined conduction interval. That is, they are excited coincidently for torque production throughout a common time interval. Moreover, the polarities of the companion stator pole winding pairs are arranged so that the magnetic flux patterns are identical to those of the conventional SRM, as illustrated in FIG. 2. In this way, under non-faulted conditions, the new SRM drive operates in the same manner as the conventional SRM drive of FIG. 1.

However, unlike the conventional SRM drive, if a fault occurs in an inverter phase or a machine phase of the SRM drive of FIG. 4, then no dead zone in torque production is created. For example, even if excitation is lost to stator pole winding 28a due to a fault, uninterrupted excitation to the opposing or companion stator pole winding 28b ensures that there nevertheless is some torque production during the conduction interval of the corresponding motor phase.

Figure 5:
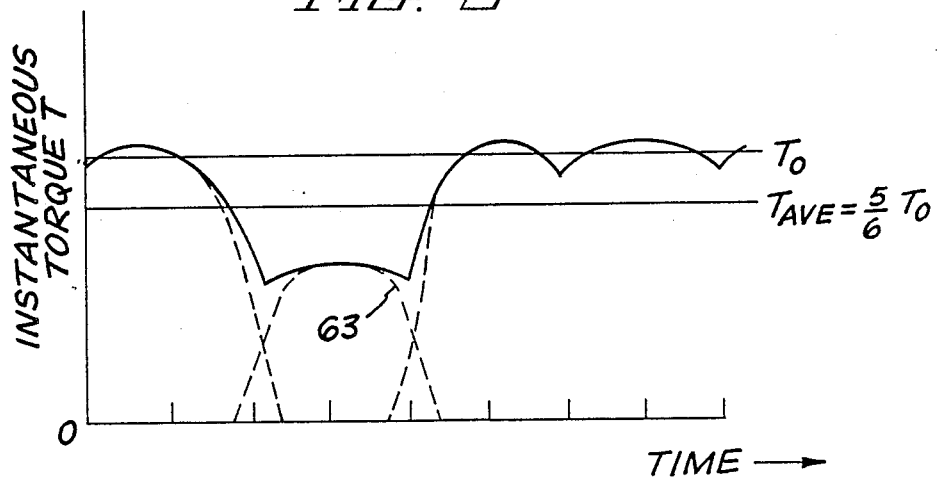
FIG. 5 is a graphical representation of the instantaneous torque waveform for the SRM drive configuration of FIG. 4.

FIG. 5 is a graphical illustration of the instantaneous torque waveform (T) for the SRM drive configuration of FIG. 4 following loss of excitation to a stator pole winding of a faulted motor phase. The torque contribution from the companion stator pole winding of the faulted phase is shown by dashed lines 63. As illustrated, because the companion stator pole winding of the faulted phase still produces torque during the respective conduction interval, there is no dead zone and the average torque production $T_{AVE}$ is approximately 5/6 of the initial pre-fault value $T_0$, averaged over a complete rotation. Moreover, using this configuration, the post-fault average torque may be increased to the pre-fault value $T_0$ if there is sufficient current capacity to overexcite the remaining intact stator pole windings. Advantageously, in the absence of a torque dead zone, no special controls are required to restart the motor if the rotor stops following a fault.

Under normal, non-faulted operating conditions, the excitation of two opposing or companion stator pole windings with equal currents ensures that the radial pull forces from the two corresponding poles cancel, while their torque contributions add. However, when excitation is removed from only one stator pole winding of a companion pair, there is a net radial pull force on the rotor in addition to the desired tangential force or torque. Therefore, it may be necessary to reinforce the motor bearings to withstand the resulting unbalanced magnetic pull on the rotor.

In an alternative embodiment of the present invention, generation of the hereinabove described unbalanced magnetic force is prevented. By way of example, FIG. 6 shows a three-phase SRM 70. As illustrated, SRM 70 includes a rotor 72 within a stationary stator 74. Rotor 72 has four pairs of diametrically opposite rotor poles 74a–74b, 76a–76b, 78a–78b and 80a–80b. Stator 74 has six pairs of diametrically opposite or companion stator poles 82a–82b, 84a–84b, 86a–86b, 88a–88b, 90a–90b and 92a–92b, respectively, fitted with companion stator pole winding pairs 96a–96b, 98a–98b, 100a–100b, 102a–102b, 104a–104b and 106a–106b, respectively. In this example, each motor phase comprises two pairs of diametrically opposing or companion stator pole windings; i.e., two companion stator pole winding pairs. For example, the two stator pole winding pairs 96a–96b and 102a–102b comprise one of the three motor phases of SRM 70. Preferably, two independent power inverters 105 and 107 are employed to drive SRM 70. Each respective inverter phase leg corresponds to a separate respective motor phase and comprises two semiconductor switches and two flyback diodes which excite opposite or companion stator pole windings connected in series with each other. Alternatively, the two stator pole windings comprising each companion pair, such as 96a–96b, can be connected in parallel. The four stator pole windings corresponding to each respective motor phase are excited for torque production during the same time interval; i.e., they share an entire conduction interval in common.

When a fault occurs in a motor phase of SRM 70 such that excitation is removed from one pair of companion stator pole windings corresponding to a respective motor phase, excitation is not interrupted to the other companion stator pole winding pair. Advantageously, therefore, in this embodiment of the SRM drive, the fault does not create an unbalanced magnetic pull on the rotor or its bearings since both diametrically opposed windings in the faulted phase are unexcited. Moreover, if excitation is lost to stator pole winding pair 96a–96b, for example, uninterrupted excitation to the companion pair 102a–102b of that faulted phase ensures that symmetrical excitation continues. Further, the average torque production is reduced only by approximately 1/6 of its pre-fault value for the same current, and no torque dead zone is created by the fault.

Still another alternative embodiment of the inverter configuration used to drive SRM 70 is shown in FIGS. 7A–7D. In this embodiment, post-fault average torque is increased even further. As shown, four independent three-phase inverters 110, 112, 114 and 116 are employed. Each phase leg of each inverter corresponds to one respective motor phase and excites one stator pole winding of a companion pair corresponding thereto. Loss of one inverter phase leg due to a fault removes excitation from only one stator pole winding, resulting in loss of only approximately 1/12 of the pre-fault average torque.

It is to be understood that the present invention is not limited to three-phase SRM drives and SRG systems, but may be extended to SR machines having any number of phases. Moreover, the present invention is not limited to the numbers of stator poles and rotor poles hereinabove described. For example, for a four-phase SR machine having eight stator poles and six rotor poles, each of four inverter phases can be used to excite two companion stator pole windings corresponding to a respective machine phase. Alternatively, each of the eight stator pole windings can be excited by a separate inverter phase, the excitation of the four stator pole winding pairs being synchronized during normal operation.

While the preferred embodiments of the present invention have been shown and described herein, it will be obvious that such embodiments are provided by way of example only. Numerous variations, changes and substitutions will occur to those of ordinary skill in the art without departing from the invention herein. Accordingly, it is intended that the invention be limited only by the spirit and scope of the appended claims.

What is claimed is:

1. A fault-tolerant switched reluctance machine drive, comprising:
   a multiphase switched reluctance machine including a rotor and a stator, said rotor having a plurality of rotor poles, said stator having a plurality of pairs of opposing stator poles, each phase of said machine comprising at least one said pair of opposing stator poles, each of said stator poles having a concentrated stator pole winding wound thereon;
   a plurality of independent power inverters, the number of said inverters being equal to the number of said stator pole windings corresponding to each machine phase, each of said inverters comprising a power supply for impressing a DC voltage across said stator pole windings, each of said inverters including at least one current switching device connected in series with a separate one, respectively, of said stator pole windings, the series combination of each said stator pole winding and the corresponding series-connected switching device comprising a separate respective phase leg of the corresponding inverter; and gate drive means coupled to each respective current switching device for exciting the corresponding stator pole winding connected in series therewith, the stator pole windings of said inverters corresponding to the same machine phase having substantially the same conduction interval, the conduction intervals for the different machine phases being mutually time-shifted.

2. The switched reluctance machine drive of claim 1 wherein each of said inverters is driven by a separate respective DC power supply.

3. The switched reluctance machine drive of claim 1 wherein each said phase leg further comprises at least one diode coupled to the corresponding stator pole winding for circulating inductive winding currents.

4. The switched reluctance machine drive of claim 1 wherein each said phase leg includes a second current switching device connected in series with the respective stator pole winding thereof.

5. The switched reluctance machine drive of claim 4 wherein each said phase leg further comprises at least one diode coupled to the corresponding stator pole winding for circulating inductive winding currents.

6. The switched reluctance machine drive of claim 4 wherein each said current switching device comprises a field effect transistor.

7. The switched reluctance machine drive of claim 6 wherein each said phase leg further comprises at least one diode coupled to the corresponding stator pole winding for circulating inductive winding currents.

8. The switched reluctance machine drive of claim 1 wherein the poles of each said pair of opposing stator poles are diametrically opposed.

9. The switched reluctance machine drive of claim 1 wherein each machine phase further comprises a second pair of opposing stator poles, the switched reluctance machine drive further comprising two additional said power inverters, each said two additional inverters including a phase leg corresponding to each respective machine phase.

10. The switched reluctance machine drive of claim 9 wherein the poles of each said pair of opposing stator poles are diametrically opposed.

11. A fault-tolerant switched reluctance machine drive, comprising:

a multiphase switched reluctance machine including a rotor and a stator, said rotor having a plurality of rotor poles, said stator having a plurality of pairs of opposing stator poles, each phase of said machine comprising at least two said pairs of opposing stator poles, each of said stator poles having a concentrated stator pole winding wound thereon;

a plurality of independent power inverters, the number of said inverters being equal to the number of said pairs of opposing stator poles, each of said inverters comprising a power supply for impressing a DC voltage across said stator pole windings, each of said inverters including at least one current switching device connected in series with a separate respective pair of stator pole windings corresponding to each respective pair of said opposing stator poles, the combination of each respective pair of stator pole windings and corresponding series-connected switching device comprising a separate respective phase leg of the corresponding inverter; and gate drive means coupled to each respective current switching device for exciting the corresponding stator pole winding pair coupled thereto, the stator pole winding pairs of said inverters corresponding to the same machine phase having substantially the same conduction interval, the conduction intervals for the different machine phases being mutually time-shifted.

12. The switched reluctance machine drive of claim 11 wherein the two stator pole windings of each said pair of opposing stator poles are connected in series.

13. The switched reluctance machine drive of claim 11 wherein the two stator pole windings of each said pair of opposing stator poles are connected in parallel.

14. The switched reluctance machine drive of claim 11 wherein each of said inverters is driven by a separate respective DC power supply.

15. The switched reluctance machine drive of claim 11 wherein each said phase leg further comprises at least one diode coupled to the respective pair of stator pole windings for circulating inductive winding currents.

16. The switched reluctance machine drive of claim 11 wherein each said phase leg includes a second current switching device connected in series with the respective pair of stator pole windings.

17. The switched reluctance machine drive of claim 16 wherein each said phase leg further comprises at least one diode coupled to the respective pair of stator pole windings for circulating inductive winding currents.

18. The switched reluctance machine drive of claim 16 wherein each said current switching device comprises a field effect transistor.

19. The switched reluctance machine drive of claim 18 wherein each said phase leg further comprises at least one diode coupled to the respective pair of stator pole windings for circulating inductive winding currents.

20. The switched reluctance machine drive of claim 11 wherein the poles of each said pair of opposing stator poles are diametrically opposed.

* * * * *